United States Patent [19]
Carey

[11] 3,821,007
[45] June 28, 1974

[54] SPRAY-TYPE PAN RELEASE AND METHOD OF MAKING THE SAME

[75] Inventor: Wayne C. Carey, Rittman, Ohio

[73] Assignees: Wendel W. Carey; Mrs. Kay Freeland, both of Rittman, Ohio; part interest to each

[22] Filed: Mar. 15, 1973

[21] Appl. No.: 341,400

[52] U.S. Cl.............. 106/150, 106/154, 117/167, 426/198
[51] Int. Cl.... C08b 25/02, C08b 21/44, C08h 9/00
[58] Field of Search............ 106/150, 154; 99/144; 426/198

[56] References Cited
UNITED STATES PATENTS

| | | | |
|---|---|---|---|
| 2,653,876 | 9/1953 | Hanson | 99/144 |
| 2,796,363 | 6/1957 | Lalone | 117/167 |
| 2,844,470 | 7/1958 | Akerboom | 99/144 |

*Primary Examiner*—Theodore Morris
*Attorney, Agent, or Firm*—Oldham & Oldham Co.

[57] ABSTRACT

A spray type pan release material and a method for making the same including heating a vegetable shortening to melt the same, mixing the melted liquid shortening with commercial grades wheat and soybean flour, and thereafter mixing a liquid vegetable salad oil and lecithin with the flour-shortening mixture to obtain a homogeneous paste mixture that can be dispensed from an aerosol container to form a superior release coating on a desired article.

4 Claims, No Drawings

SPRAY-TYPE PAN RELEASE AND METHOD OF MAKING THE SAME

BACKGROUND OF THE INVENTION

Heretofore it always has been a problem to release various materials from cooking utensils after a cooking action therein. Thus, people may rub butter or other greases onto a cooking container prior to placing the material to be cooked therein. Thereafter, after the cooking operation, it still is very difficult in many instances to release the cooked article from the cooking vessel. Or, it is also desirable to use release materials when forming other articles, such as molded gellatin products, and other foodstuffs. Furthermore, the ultimate cleaning of the cooking or containers or vessels used is difficult in many instances.

While special release coated vessels are available, they are somewhat expensive and many other vessels are used that require individual coatings.

The general object of the present invention is to provide a novel and improved method of making a sprayable material for use as a pan release coating and wherein vegetable shortening and salad oils are mixed with flours and lecithin to form a homogeneous mixture capable of being dispensed from an aerosol container.

Another object of the invention is to mix a release material by heating a shortening material to liquify it and mixing it with flours to form a homogeneous paste after which a vegetable oil which will not turn rancid is added to the mixture to aid in obtaining a homogeneous light paste for use as a release material when sprayed onto any given article.

Another object of the invention is to provide a storable and sprayable release paste material which will readily coat, adhere and form a film on an article, which film is non-injurious to either foodstuffs and/or humans and which film can be applied to cooking vessels, utensils, and the like.

The foregoing and other objects and advantages of the invention will be made more apparent as the specification proceeds.

SUMMARY OF INVENTION

This invention, as one embodiment thereof, relates to forming a pan release coating by heating about 100 lbs. of vegetable shortening to melt the same and raising the temperature of the shortening to a temperature up to about 225° F., mixing the melted liquid shortening with high grade commercial soft wheat flour and commercial grade high fat soybean flour and wherein about 50 lbs. of the wheat flour and about 25 lbs. of soybean flour are present to form a thin paste therefrom, and mixing about 125 lbs. of a liquid vegetable salad oil and about 8 lbs. of lecithin with the flour-shortening mixture to obtain a homogenous liquid which on cooling forms a light viscous paste. Thereafter, this paste mixture can be placed in any conventional type of an aerosol container with a compressed propellant gas therein for dispensing the liquid mixture as a spray mist onto a desired article at a later time.

It has been found that a sprayable material for use as a pan release coating, or equivalent coating material, can be made from the following ingredients:

| | |
|---|---|
| Soft Wheat Flour | 50 parts by weight |
| High Fat Soybean Flour | 25 parts |
| All Purpose Vegetable Shortening | 100 parts |
| A Liquid Vegetable Salad Oil, specially refined | 125 parts |
| Lecithin | 8 parts |

In making up the composition of the invention, it has been found that the vegetable shortening can be heated to melt the same and it should be heated to a temperature of from about 150° up to about 225° and preferably being preheated in the range of about 200° to 225° so that when mixed with the wheat flour and soyflour, a smooth paste is formed therefrom and the shortening is present, it is believed, in more or less of an emulsified liquid form. Thereafter, the lecithin and liquid salad oil are usually mixed together and then added to the flour-shortening mixture and uniformly blended therewith to form a substantially homogeneous mixture with the shortening staying therein, it is believed, in a semi-emulsified form. The final mixing step is continued only long enough to obtain a uniform light liquid as the mix is still at a temperature appreciably above ambient. Additional mixing action may force air into the mix or be otherwise undersirable. Upon cooling to about 110° to 120° F., a light viscous paste is formed. Such paste is flowable and has low viscosity.

Thereafter, this liquid-emulsified paste mixture, which has low viscosity, can be placed in any conventional propellant container of the aerosol type and with a conventional propellant gas being present in the container under pressure for aerosol dispensing action at a later time as desired.

While any conventional propellant can be used, a material such as trichloro-mono-fluoro metracane is one propellant that has been used very satisfactorily. Normally, any halogenated hydrocarbon of the gas propellant type can be used in practice of the invention. U.S. Pat. No. 2,849,323 discloses other conventional propellants.

In the quantities of materials set forth in the foregoing example, the quantities of vegetable oil and shortening can be varied to be about 4 or 5 percent parts less than stated herein up to about 15 percent more than the quantities or parts indicated. Preferably the amount of flour used stays constant whereby the variation in oil and shortening will not alter the ultimate desirable characteristics of the pan release composition.

Specifically, in practice of the invention, the shortening used was Capital City Products Co., Columbus, Ohio, BBS Shortening, which has the following characteristics:

| | |
|---|---|
| Capillary Melting Point | 117° F. |
| Wiley Melting Point | 114.5° F. |
| Free Fatty Acid | 0.03% |
| Color | 4 yellow – 0.4 red |
| Flavor | Good |
| Penetration | 136 |
| AOM Stability | Over 100 hours |
| SFI: 50° F. | 30.1 |
| 70° F. | 20.2 |
| 80° F. | 18.8 |
| 92° F. | 13.9 |
| 101° F. | 9.7 |

The vegetable salad oil used was also provided by the same Capital City Products Co. and is their product, Sta Bland Oil. This is an all purpose vegetable salad oil that will not turn rancid in use. Its characteristics are:

| | |
|---|---|
| Color | 10.0 Yellow – 1.0 Red |
| Free Fatty Acid | 0.03% |
| Flavor | Good |
| Peroxide Value | 1.0 |
| A.O.M. | 20 hours |
| Cold Test | 15 hours |

When placing the release material in a container for propelling action, preferably about 60 percent of the light paste release material is present in the can which contains approximately 40 percent by weight of propellant but these amounts can vary as desired. The mixture will spray as a thin mist that adheres and covers or sets up relatively rapidly to provide a continuous coating on the article coated with the spray.

The release material has functioned effectively to permit convenient and easy release of products cooked or baked, etc. in containers with the release material thereon to provide for easy cleaning of the utensil or pan. The material of the invention can even be sprayed onto a hot skillet or cooking member and it still acts to provide a release coating thereon.

From the foregoing, it is believed that a novel and improved composition and method of forming a release coating has been provided by the invention. Hence, the objects of the invention have been achieved.

While one complete embodiment of the invention has been disclosed herein, it will be appreciated that modification of this particular embodiment of the invention may be resorted to without departing from the scope of the invention.

What is claimed is:

1. A method of making a non-aqueous sprayable material for use as a pan release coating comprising the steps of
heating vegetable shortening up to a temperature of between about 150° to 225° F. to melt the same, mixing the melted liquid shortening with commercial grades of flour and soybean flour, mixing a liquid vegetable salad oil and lecithin with the flour-shortening mixture to obtain a homogeneous mixture than can be dispensed from an aerosol container to form a coating on a desired article.

2. A method of making a sprayable material that has no water therein for use as a pan release coating comprising the steps of
heating about 100 parts of a vegetable shortening up to a temperature of between about 150° to 225° F. to melt the same, mixing the melted liquid shortening with commercial grades of wheat flour and soybean flour with about 50 parts of flour and about 25 parts of soyflour being used, mixing about 125 parts of a liquid vegetable salad oil and about 8 parts of lecithin with the flour-shortening mixture to obtain a homogeneous liquid mixture, cooling to obtain a low viscosity paste, placing the paste in a container with a compressed propellant gas whereby the mixture can be dispensed from the container to deposit onto an article to form a release coating thereon.

3. A method of making a sprayable material as in claim 2 where the amount of shortening and/or vegetable salad oil used may vary from about minus 5 percent up to plus about 15 percent.

4. A method of making a sprayable material as in claim 3 wherein the mixing of the vegetable salad oil and lecithin with the flour-shortening mixture is performed with the temperature of the resultant mix being appreciably above ambient temperature.

* * * * *